Aug. 17, 1926.

P. S. GAURIAT 1,596,012

MOTION PICTURE PROJECTION APPARATUS

Filed Feb. 4, 1922    2 Sheets-Sheet 1

Pierre Sylvain Gauriat
INVENTOR;

By
his Attorney.

Aug. 17, 1926. 1,596,012
P. S. GAURIAT
MOTION PICTURE PROJECTION APPARATUS
Filed Feb. 4, 1922 2 Sheets-Sheet 2

Pierre Sylvain Gauriat
INVENTOR;
By
his Attorney.

Patented Aug. 17, 1926.

1,596,012

UNITED STATES PATENT OFFICE.

PIERRE SYLVAIN GAURIAT, OF PARIS, FRANCE, ASSIGNOR TO PATHE CINEMA, ANCIENS ETABLISSEMENTS PATHE FRERES, OF PARIS, FRANCE.

MOTION-PICTURE PROJECTION APPARATUS. REISSUED

Application filed February 4, 1922, Serial No. 534,073, and in France February 21, 1921.

This invention relates to a motion picture projection apparatus of small size or toy motion picture device which may be easily operated and used with advantage by amateurs.

One characteristic feature of this apparatus consists in the fact that the film driving mechanism is controlled by the action of a lever or similar element co-operating with a contact element which is caused to bear upon one edge of the film in such manner that when the said contact element falls into a notch in the edge of the film the said lever or like element will act upon the film driving element in order to disengage the same from the film, whereby said driving mechanism goes on working but without acting upon the film; the latter is thus kept stationary, either to carry out a stationary projection or to prevent the film from being torn from its storage reel when near the end of the projection.

An advantage resulting from such a construction resides in the fact that the transfer can be easily made from a motion picture projection to a stationary picture projection such as a title, a fixed object or the like, and vice versa, without being obliged to stop the driving mechanism and consequently obviating all shocks or effects of inertia. On the other hand, the film may be automatically stopped at the end of the projection without any risk of tearing the film away from the storage reel to which the rear end of the film is preferably secured in a permanent manner as it has been described in my copending application Serial No. 533,345.

In the accompanying drawings, given by way of example:—

Figure 1:
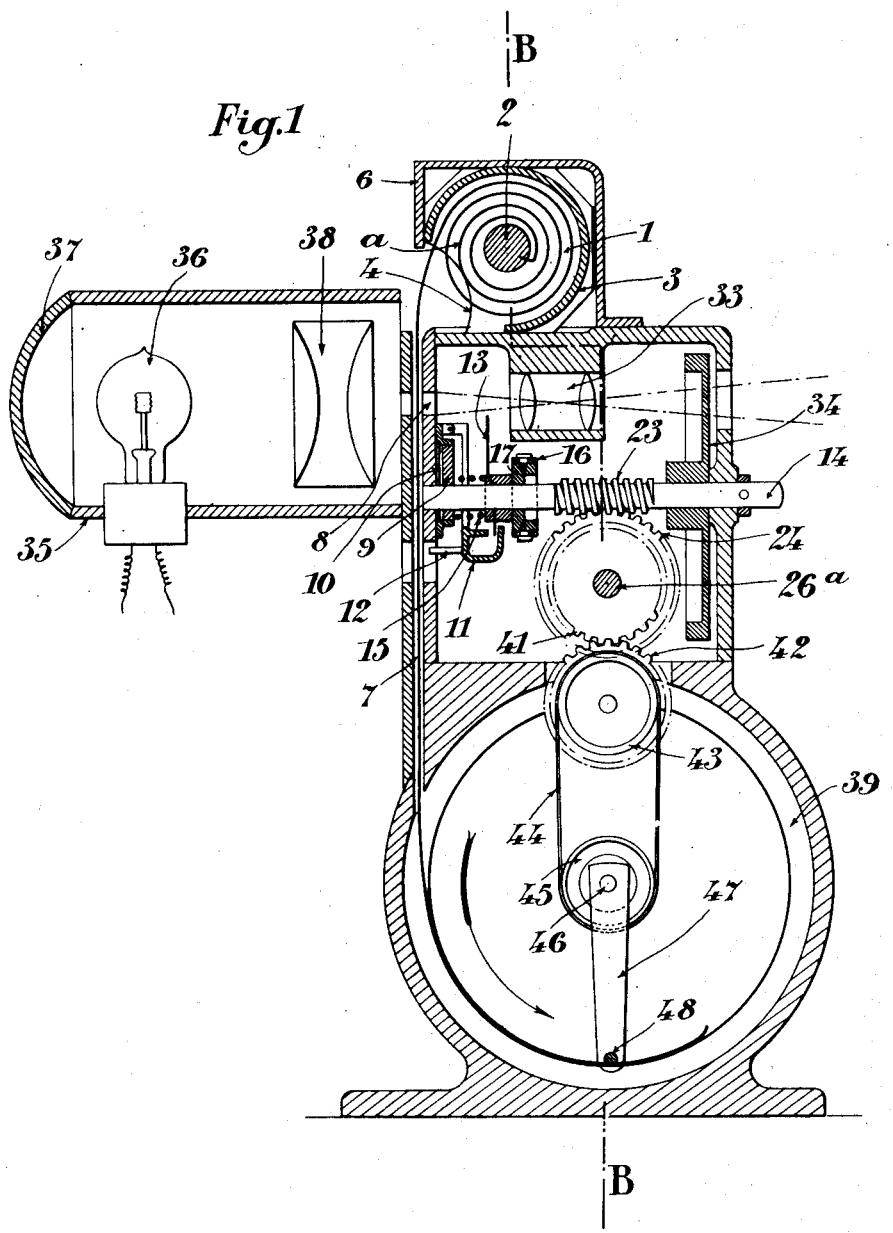
Figure 2:
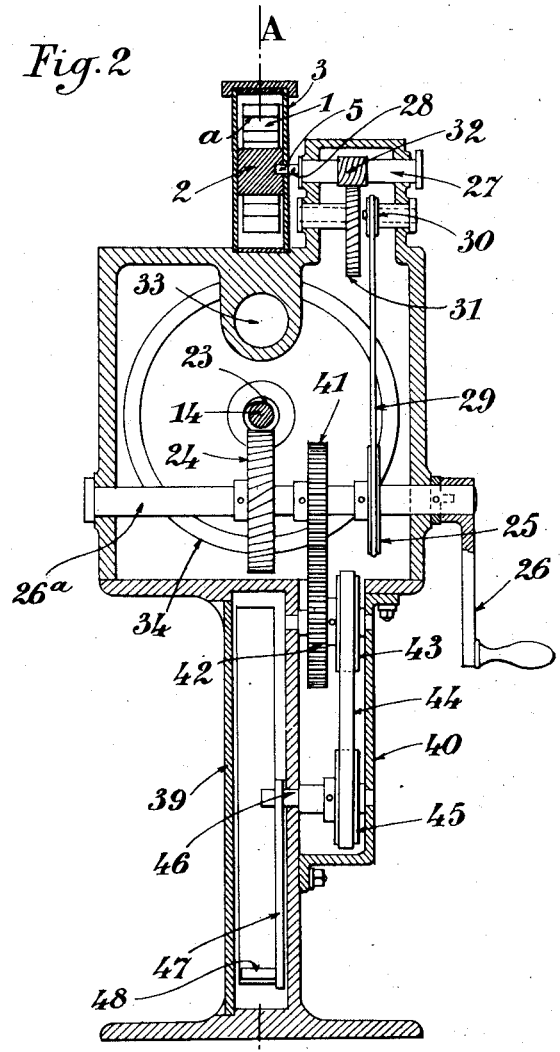
Figure 3:
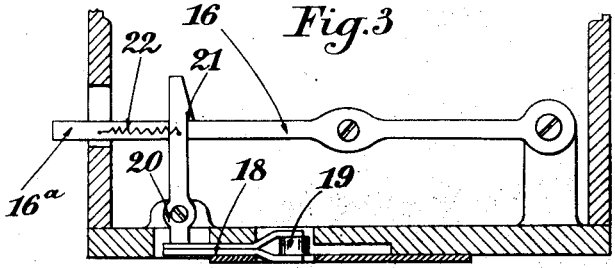

Fig. 1 is a vertical lengthwise section of the apparatus on the line A—A, Fig. 2. Fig. 2 is a cross section on the line B—B, Fig. 1.
Fig. 3 is a diagrammatic view of the mechanism for stopping the film either during the course of the projection or at the end of the same by removing the claws of the entraining mechanism from the film.

1 is the storage reel with the revoluble core 2 having permanently secured thereto one end of the film to be projected, the said core being provided at one end with a diametral groove 5 for actuating the same by mechanical means; 3 are the side walls of the storage reel and 4 the aperture formed in the walls thereof, 6 is the support or bracket for securing the storage reel to the projection apparatus. 7 is a guideway for the film and 8 the film gate of the apparatus. 9 is a cam for actuating the frame 10 which carries the support 11 for the feeding claws 12. As shown in the drawing said support 11 is pivoted on the frame 10, and 13 is a helical disc plate or cam providing for the forward or backward movement of the claw support 11. The said disc cam 13 is slidable on the shaft 14 of the cam 9 and is kept away from the said cam by a spring 15: the cam 13 is caused to rotate together with the shaft 14 by means of a suitable key connection.

A lever 16 (Figs. 1 and 3) is secured upon a ring 17 for impelling the cam 13 towards the cam 9. 18 is a slidable member having disposed at the end thereof a contact roller 19 adapted to bear upon the edge of the film, the said member actuating a pawl or catch 20 whereof the nose 21 engages the lever 16 in normal operation. A spring 22 maintains the contact between the roller 19 and the edge of the film. When the roller enters a notch suitably provided in the film, under the action of the spring 22, the lever 16 is disengaged from the pawl 20 and the cam 13 which is pushed to the right (Fig. 1) by the spring 15 will withdraw the claw 12 from the film. To resume the projection, the operator pushes by hand the lever 16 at the end 16ª, whereupon the nose 21 of the pawl 20 will again engage the lever; the film is thus restarted and the roller 19 leaves the notch in the film; the lever 16 may then be released.

23 is a driving worm mounted on the shaft 14 and in engagement with the worm wheel 24. 25 is a pulley mounted on the shaft of the actuating crank 26. 39 is a flat circular casing wherein the film is caused to enter directly after passing through the guide 7, the film moving before the aperture 8 and being engaged by the feeding claws. The mechanism for rewinding the film is constituted by the shaft 27 having disposed at the end thereof the screwdriver member 28 adapted to engage the groove 5 of the core 2 forming part of the storage reel 1. The said shaft is actuated by the movement of the hand crank by means of the pulley 25, the belt 29, the pulley 30, the worm wheel 31 and the worm 32.

The teeth of the wheel 31 and the worm 32 are situated in the oblique direction in such manner that the shaft 27, which has a sufficient play at the journals, is withdrawn from the storage reel when the crank is turned in the direction corresponding to the projection, but will engage the said core upon rotating the crank in the contrary direction.

The apparatus is completed by the objective 33, a combined fly wheel and shutter 34, and an optical arrangement for projection purposes comprising the lantern 35, the lamp 36, mirror 37 and condenser 38.

In the form of construction shown in the drawing, the apparatus is further completed by a winding device disposed as follows. The driving shaft 26ª has mounted thereon a gear wheel 41 engaging a gear wheel 42 mounted in a casing 40 which is secured to the casing 39. The gear wheel 42 has secured thereto the pulley 43 which is connected by a belt 44 with a second pulley 45 whose shaft 46 extends within the casing 39 at the centre of the same. To the shaft 46 is secured a radial arm 47 having at the end thereof a small pin 48 disposed parallel to the shaft.

Upon turning the crank 26 for the projection of the views, the film will move downwardly under the action of the claws 12 while at the same time the arm 47 is given a movement of rotation within the casing 39. The pin 48 is thus brought in contact with the film and acts upon the latter by friction in the direction of the winding, thereby facilitating the formation of the spiral turns.

To facilitate the winding, it is advantageous to previously give a slightly curved shape to the film in such manner that the end of the film will itself take a suitable position for the engagement with the pin 48. One method for obtaining this deformation of the film consists in placing the reels of film in a drying room at a temperature of about 50° centigrade. Films thus prepared will roll up in a very satisfactory manner in coils having regular turns.

By the use of the described device, a considerably greater length of film can be stored in the casing 39 than if the said device were not employed.

It will be observed that there is still obtained with the said device the important advantage arising from the facility with which the film may be disposed in the operating position without being obliged to secure the forward end of said film to a winding reel as in the major part of the known devices.

The operation of the apparatus is as follows: Upon turning the crank 26, the shaft 14 is rotated by means of the worm 23. The cam 9 imparts a vertical motion to the claw support 11, and the claws 12 engaging the perforations of the film will cause the latter to move downwards. The cam 13 when rotating causes the support 11 to pivot on the frame 10, and thus withdraws the claws 12 at stated intervals to release the same from the film, thus causing the claws to move upwardly in the disengaged position. Should it be desired to temporarily obtain a fixed projection, such for instance as the projection of a title, the roller 19, Fig. 3, will fall into a notch provided at a suitable place in the edge of the film; the lever 20 will thus be drawn by the spring 22, the nose 21 of the same will disengage the lever 16, and the cam 13 may thus recede under the action of the spring 15, thereby maintaining the claws 12 constantly out of engagement with the film. The latter will thus be held stationary while at the same time the whole mechanism of the apparatus is still operating in a continuous manner, thus affording the advantage of obviating all shocks when changing over from the motion picture to the fixed projection or the contrary. The motion picture projection is recommended by operating the lever 16 by hand.

When near the end of the projection, the roller 19 will fall into another notch in the film which is formed in the edge towards the end of the same, and in this manner the film is stopped, as in the case of the fixed projection shortly before it has become entirely unwound, thus preventing all tearing of the film from the core 2 of the storage reel.

Having now described my invention, what I claim as new and desire to secure by Letters Patent is:—

In a motion picture projection apparatus, the combination of a film feeding member of the type comprising a claw adapted to engage and disengage the film perforations, with a control shaft for the film feeding member, a sleeve mounted on said shaft so as to be rotated by and to slide along the same, a cam secured to said sleeve and adapted to oscillate said feeding member to and from the film, a lever pivoted to the apparatus body and connected to said sleeve so as to be capable of moving the same along the shaft and thereby move the feeding member into and out of the film path, a spring urging said sleeve and lever away from the film, a spring controlled pawl adapted to retain the lever against the action of said spring, and a contact member adapted to engage the edge of the film and operatively connected to said pawl.

In testimony whereof I have signed my name to this specification.

PIERRE SYLVAIN GAURIAT.